Aug. 1, 1967 H. SCHAFSTELLER 3,333,649
WEIGHT INDICATOR ZERO-ADJUSTMENT APPARATUS FOR BELT CONVEYOR
Filed Nov. 27, 1964 2 Sheets-Sheet 1
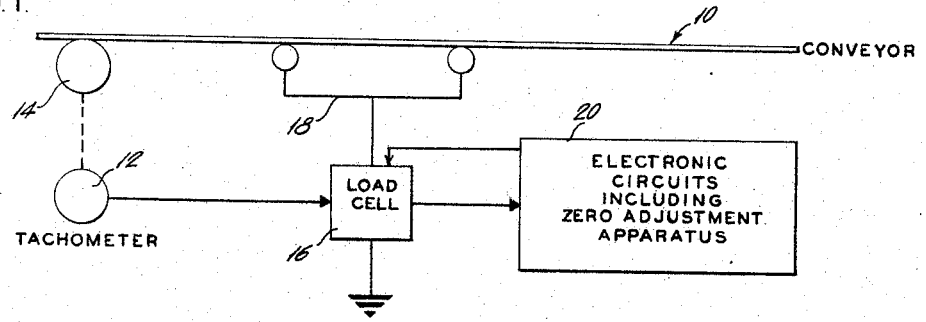
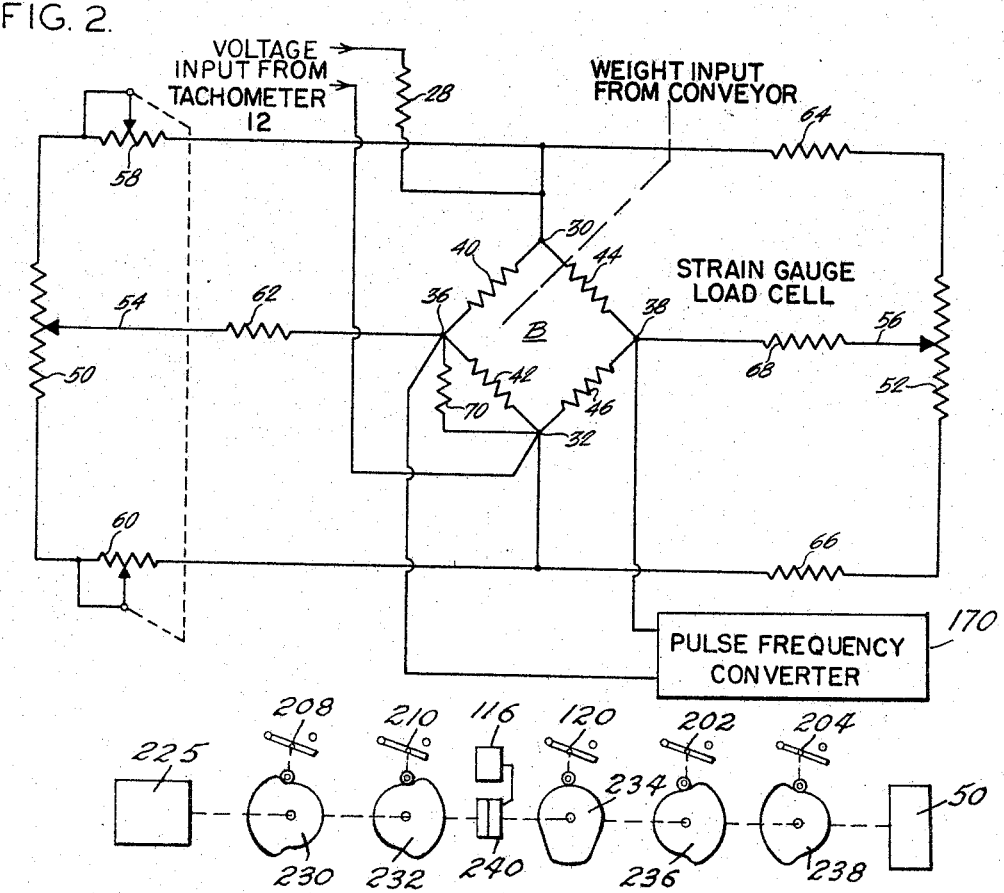
INVENTOR:
HELMUT SCHAFSTELLER
BY Howson & Howson
ATTYS.

Aug. 1, 1967 H. SCHAFSTELLER 3,333,649
WEIGHT INDICATOR ZERO-ADJUSTMENT APPARATUS FOR BELT CONVEYOR
Filed Nov. 27, 1964 2 Sheets-Sheet 2

INVENTOR:
HELMUT SCHAFSTELLER
BY Howson & Howson
ATTYS.

United States Patent Office 3,333,649
Patented Aug. 1, 1967

3,333,649
WEIGHT INDICATOR ZERO-ADJUSTMENT APPARATUS FOR BELT CONVEYOR
Helmut Schafsteller, Ambler, Pa., assignor to Compudyne Corporation, Hatboro, Pa., a corporation of Pennsylvania
Filed Nov. 27, 1964, Ser. No. 414,082
9 Claims. (Cl. 177—211)

The present invention relates to a zero adjustment apparatus for a weight indicator, and, more particularly, to an apparatus for adjusting and readjusting to an average zero the indication of material weighing means for an endless belt type conveyor with no loose aggregate material on the conveyor.

Systems of the type with which the present invention is particularly concerned employ a conveyor to carry aggregate material from a point of delivery to a point of discharge. In such systems it is customary to employ with the conveyor for weighing the aggregate material conventional weighing means such as, for example, an electric load cell. A suitable load cell would include a plurality of strain gauge resistors connected in a bridge circuit which has a voltage source across input terminals and output terminals across which an indicator meter may be placed. The output voltage of such a bridge circuit in accordance with the present invention is adjustable to reflect a change in average zero when loose aggregate material is not being carried on the conveyor.

The load cell bridge circuit cannot simply be initially adjusted to zero voltage output and left. Instead correction of zero setting of the bridge circuit to compensate for changes in the weight of the conveyor must frequently be made if accurate weighing is desired. The frequent correction is necessary to compensate for zero shifts in the voltage output of the load cell bridge circuit caused by changes in temperature and atmospheric pressure, instrument drift, dirt accumulation at the weighing area, material clinging to the conveyor, and other causes inherent in conveyor scales. The need for adjustment for zero shifts may occur over a relatively short period of time. The present invention provides an accurate and systematic zero adjustment apparatus which operates automatically to correct for zero shifts.

In accordance with the present invention, there is provided in the system of the load cell bridge circuit a zero adjustment means connected to the input terminals of the bridge circuit and one of the output terminals to produce a change in voltage across the strain gauge resistors connected between the input terminals and the one output terminal. Drive means is employed to respond to and accumulate instantaneous errors in the zero set and to readjust the zero adjustment means to correct the average zero set of the bridge circuit. Coupling means is provided to couple the load cell bridge circuit to the drive means for a predetermined number of revolutions of the conveyor in order to position the drive means to represent the average error per revolution in the zero set and alternatively to couple the drive means to a power source and to couple the drive means to the zero adjustment means by an amount representative of the negative of the average error per revolution.

In accordance with one form of the present invention, the zero adjustment means comprises a voltage divider connected to the input terminals having a variable connection connected to the one output terminal.

In a preferred form of the present invention, the means selectively responsive to the output of the bridge circuit includes a reversible motor responsive to the signal from the output terminals of the bridge circuit to actuate the motor to accumulate in terms of change in the angular shaft position the average error per revolution of the belt. Suitable memory means is coupled to the motor for being moved in accordance with shaft movement. Also employed is means for selectively coupling the memory means to the variable connection on the voltage divider for having the variable connection moved in accordance with the output of the motor. More particularly, the memory means is coupled to the motor for storing error indicated by the output signal from the bridge circuit. Actuator means is provided for coupling the motor and memory means to the variable tap at a preselected time. Circuit means is employed for stepwise actuation of the motor shaft in either direction determined by the direction and magnitude of deviations from the zero set point at each successive position of the belt thereby additively accumulating the signal from each belt position to represent an average deviation from the zero set point. The motor then returns the memory means to its initial position, carrying with it the variable connection for the voltage divider to a point at which the bridge circuit will be at a corrected new zero set.

The system of the load cell bridge circuit may be provided with a second zero adjustment; means connected to the input terminals and the other of the output terminals to produce a change in voltage across the strain gauge resistors connected between the input terminals and the other output terminal. There may be provided means for varying the second adjustable means to electrically balance the bridge circuit when the conveyor is operated free of loose material thereon. By use of second zero adjustment means a greater range of adjustment is provided for enabling zero set of the bridge circuit.

For a better understanding of these and other features and advantages of the present invention, reference is made to the following detailed description and accompanying drawings, in which:

FIG. 1 is a block diagram illustrating an overall system embodying the present invention;

FIG. 2 is a schematic circuit diagram of the load cell circuitry with part of the zero adjustment apparatus circuitry of the present invention connected therein;

FIG. 5 is a schematic drawing of the motor and memory means used to reposition the zero set adjacent potentiometer and related switches.

Figure 3:
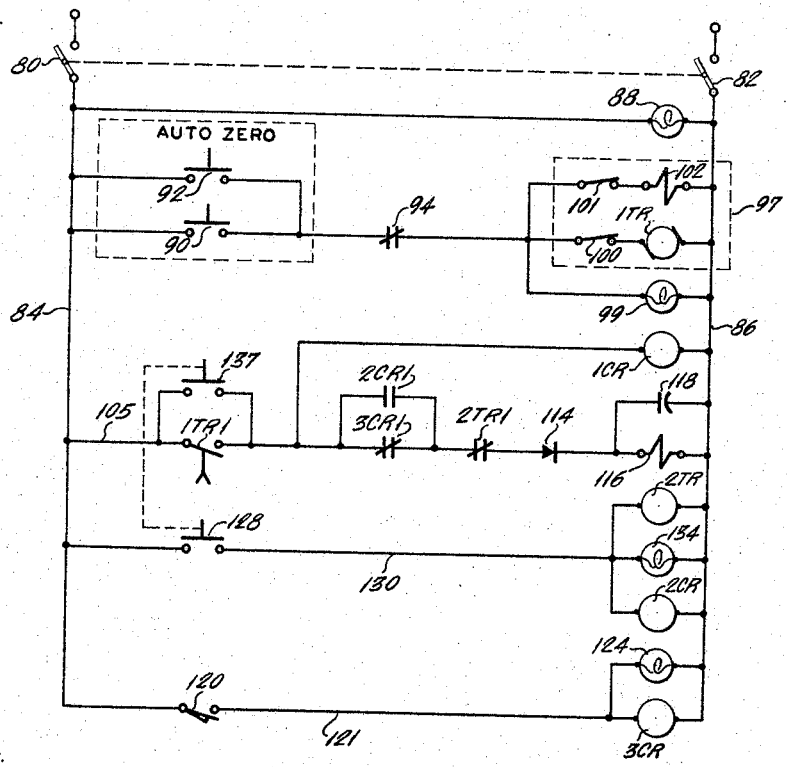
FIG. 3 is a schematic wiring diagram of switching circuits employed in the present invention.

Referring now to FIG. 1, the overall system employing the present invention is shown highly schematically. There is illustrated a portion of an endless belt conveyor, generally designated 10, adapted to carry, for example, aggregate materials from a point of introduction to a point of discharge, neither of which is shown. A tachometer generator 12 is mechanically coupled to a roller 14 engaging and driven by conveyor 10 to produce a voltage output from the tachometer proportional to the speed of the conveyor. A strain gauge load cell 16 in the form of a resistance bridge receives its voltage input from tachometer 12 proportional to conveyor speed and a mechanical input from the weight of the conveyor and its contents above carriage 18 at any moment. The output of the load cell is proportional to a product of the weight on that proportion of the conveyor supported by the idlers of carriage 18 at a particular time and the conveyor speed. Characteristically the output of the load cell is a millivolt signal read as weight per unit time. The output from the bridge is fed to an electronic voltage-analog-to-pulse-frequency converter and a pulse totalizing counter, which circuits are described in the application of Thomas L.

Mell entitled "Analog to Digital Pulse Rate Integrator and Motor Driven Counter Therefor," Ser. No. 139,520 filed Sept. 20, 1961, now U.S. Patent No. 3,264,541, and assigned to our common assignee. In such a pulse system each pulse represents a predetermined increment of weight of material passed over the conveyor.

The zero adjustment apparatus by a process of cumulative addition stores the signals representative of successive belt segments passing over the load cell at no load on the conveyor over a sampling period, represented by a predetermined integral number of full cycles of the conveyor belt. The cumulative stored signals are representative of the average departure from the previously set average zero and therefore of the error in zero set of the entire system. This error signal is then used to readjust zero set to correspond to the average zero output of the load cell.

As seen in the schematic circuit diagram in FIG. 2, the voltage from tachometer generator 12 is reduced by dropping resistor 28 connected in the line between the tachometer generator and load cell bridge circuit, generally designated B. The output of the tachometer generator is applied across the input terminals 30 and 32 of load cell bridge circuit B. The load cell bridge circuit is a Wheatstone bridge with input terminals 30 and 32 and output terminals 36 and 38. More specifically, the bridge circuit comprises a first strain gauge resistance wire 40 having one end connected to input terminal 30 and its other end connected to output terminal 36, a second strain gauge resistance wire 42 having one end connected to output terminal 36 and its other end connected to input terminal 32, a third strain gauge resistance wire 44 having one end connected to input terminal 30 and its other end connected to output terminal 38, and a fourth strain gauge resistance wire 46 having one end connected to output terminal 38 and its other end connected to input terminal 32. The strain gauge resistance wires in the arms of the bridge circuit change resistance in response to loading to give electrical indication of the variations in loading and correspondingly vary the output voltage across output terminals 36 and 38, which are connected to the electronic circuits as described in regard to FIG. 1.

In the circuit of FIG. 2 there are provided two resistors 50 and 52 each connected in parallel with the bridge circuit between input terminals 30 and 32. The resistors 50 and 52 have variable position taps 54 and 56, respectively, connected to different output terminals, tap 54 being connected to output terminal 36 and tap 56 being connected to output terminal 38. Variable tap resistor 50 provides a fine zero adjustment means for correcting apparent shifts in zero voltage at the output of the bridge circuit when the conveyor is empty, i.e. operated without loose material thereon. Changes in apparent zero voltage compensated by this adjustment may occur, for example, by material sticking to the belt or by wear of the belt. This fine zero adjustment means is provided with circuit means for automatically adjusting variable tap 54, as will hereinafter be explained. Variable tap resistor 52 provides a coarse zero adjustment means for correcting zero voltage shifts of the output of the bridge circuit when the conveyor is operated without loose material thereon. The coarse zero adjustment variable tap resistor 52 is regulated when the adjustment of the fine zero adjustment variable tap resistor 50 is not adequate to correct the zero shift, the coarse adjustment through variable tap 56 being made to place the fine zero adjustment means in range for making final precise correction.

Connected in series with variable tap resistor 50 between one side thereof and input terminal 30 is a variable resistor 58, and connected in series with the variable tap resistor 50 between the other side thereof and input terminal 32 is another variable resistor 60, the variable resistors 58 and 60 being mechanically ganged for adjustment in unison to vary the level of the voltage range across variable tap resistor 50 depending on the range of zero adjustment desired therewith. Normally the values of resistors 58 and 60 are set during preliminary adjustment and not varied thereafter. Located in the electrical line between variable tap 54 and bridge output terminal 36 is resistor 62, which by adding to the total resistance in each of the current paths between terminals 30 and 36 and between terminals 32 and 36, respectively, determines the range of fine zero adjustment produced by movement of variable tap 54.

Similarly, connected in series with coarse zero adjustment variable tap resistor 52 on the side of input terminal 30 is a resistor 64, and on the side of input terminal 32 is resistor 66. Resistors 64 and 66 serve to limit the voltage drop across coarse zero adjustment variable tap resistor and thereby determine the range of adjustment thereof. Also, located in the electrical line between variable tap 56 and output terminal 38 is resistor 68, which, corresponding in function to resistor 62, determines the range of coarse zero adjustment produced by movement of variable tap 56. Resistor 70 is connected between input terminal 32 and output terminal 36 of the bridge circuit to electrically compensate the load cell circuit for mechanical tare load of the scale which represents a percentage, approximately 25 percent, of average load.

Figure 4:
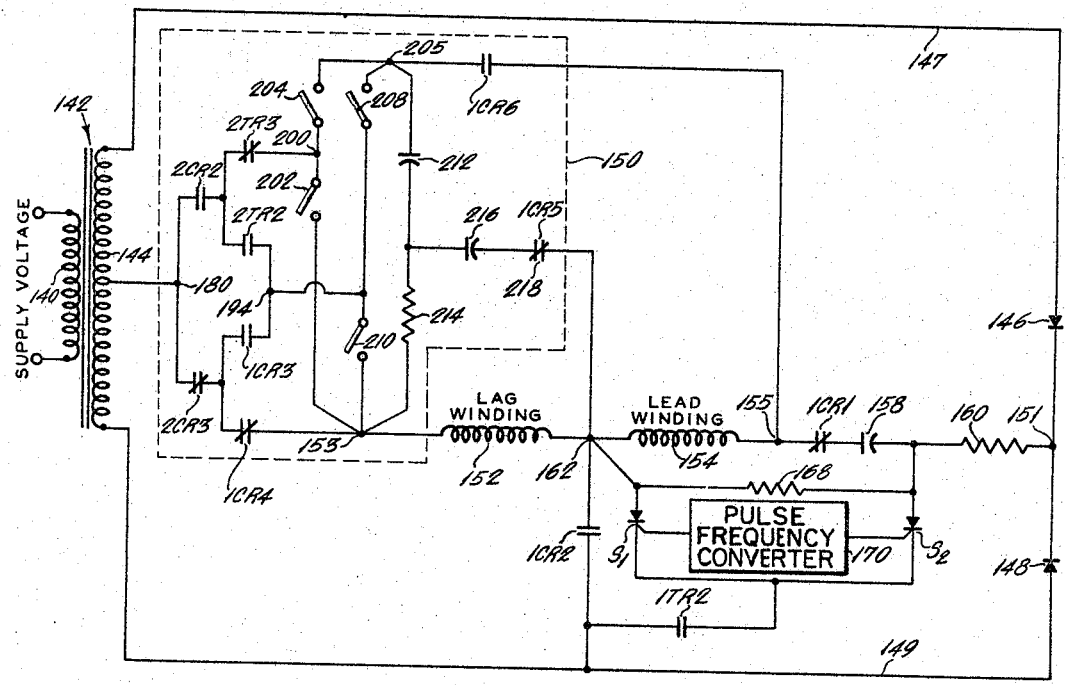
FIG. 4 is a schematic circuit diagram of part of the motor and associated switching circuits used in making the zero adjustment of the present invention.

FIGS. 3 and 4 are schematic representations of the circuit arrangements for automatically positioning fine zero-adjustment variable tap 54 along variable tap resistor 50 so that the output of the bridge load cell circuit at terminal 36 and 38, shown in FIG. 2, on the average will be zero although instantaneous readings will inevitably depart from zero. This is done in general by the use of a motor whose windings 152 and 154 appear in FIG. 4. In the process, however, the motor is normally used in at least two ways, with the switching in FIG. 4 permitting modification of the manner in which the motor acts. In summary, the motor starting at some reference shaft position is first used to accumulate instantaneous departure from the zero set point in forward and reverse steps representative of positive and negative departures from the zero position. Pulses for driving the motor in steps come from the pulse frequency converter 170 which converts voltages from the output of the bridge circuit of FIG. 2 into a signal useful to a stepping motor. The motor has associated with it a mechanical system shown schematically in FIG. 5. At the end of an integral number of complete revolutions of the belt the shaft position, and hence the position of a memory or error storage device driven by the motor shaft, is representative of the cumulative or average error in the zero set. The memory device and the motor are then mechanically connected to the fine zero voltage divider 50 and the motor is driven to reposition the tap 54 to a new corrected zero set point, if error is found. If the error is too great to be accommodated by the voltage divider, an out of limit switch is actuated which signals the conditions and permits manual readjustment of coarse potentiometer 52. Upon out of range signals other circuit elements are used to recenter the voltage divider for a rerun following the manual coarse adjustment.

As can be seen in FIG. 3, an alternating current supply voltage is electrically connected across the circuit through mechanically ganged switches 80 and 82. When switches 80 and 82 are closed energizing supply lines 84 and 86, respectively, light 88 connected therebetween will be energized indicating that the power is "on" in the zero adjusting circuit. The automatic zero adjustment of the bridge circuit is initiated by closing one of the automatic zero switches, remote switch 90 or test switch 92, which are connected between the supply lines in parallel with each other and in series with a normally-closed switch 94. Also in this series circuit are the parallel combination of light 99 which indicates that the zero adjustment is in progress and a first timer circuit 97. The timer circuit 97 includes a first timing relay 1TR and associated series switch 100, which are in turn in parallel with timer solenoid actuator 102, and associated series switch 101.

The timing relay 1TR remains energized for one or more complete revolutions of the belt conveyor, shown partially in FIG. 1, preparing the motor circuit of FIG. 4, to be explained hereinafter, for accepting the error signal from the output of the bridge load cell circuit. At the end of the sampling period for the conveyor, timing relay 1TR closes timer switch contacts 1TR1, which is connected in line 105 between supply lines 84 and 86. First timer switch contact 1TR1 is connected between the supply lines in series with first control relay 1CR. Connected in parallel with first control relay 1CR is the series combination comprising parallel connected second control relay normally-open switch 2CR1 and third control relay normally-closed switch 3CR1, in series with second timing relay normally-closed switch 2TR1, diode 114 and solenoid clutch actuator 116. The relay operated switches 2CR1, 3CR1, and 2TR1 are operated in response to energization of their respective relay windings, to be explained hereinafter. Diode 114 provides half-wave rectification for solenoid 116, and a capacitor 118 connected in parallel with solenoid 116 inhibits an instantaneous surge of current through the solenoid so that the clutch may engage more gradually. First control relay 1CR operates a series of switches in the motor circuit of FIG. 4 to connect the motor windings in desired arrangements for positioning of the variable tap 54, as will be explained in detail hereinafter. Through the apparatus shown schematically in FIG. 5 solenoid energized clutch actuator 116 operates to couple memory means operated by the motor to the fine zero-adjustment variable tap 54 for making the necessary zero correction of the bridge circuit, to be explained more fully hereinafter.

If the range of adjustment for positioning variable tap 54 along resistor 50 is not sufficient to permit reset of the average zero set point of the bridge circuit as required by the accumulated zero error in the memory device, out-of-range switch 120 in electrical line 121 will be closed thereby energizing electrical line 121 connected between supply lines 84 and 86. The out-of-range switch 120 may be actuated closed by the drive means, as will be explained hereinafter. Located in series with out-of-range switch 120 is the parallel combination of a third control relay winding 3CR and a light 124, which indicates that an out-of-range condition of the fine zero adjustment tap 54 exists.

Additional out-of-range correction circuitry is contained in electrical line 130 connected between supply lines 84 and 86. Line 130 comprises a calibrate switch 128 for energizing the electrical line connected in series with the parallel connected combination of a second timer switch relay winding 2TR, a light 134 and a second control relay winding 2CR. Calibrate switch 128 is mechanically ganged to operate with and simultaneously close calibrate switch 137, which is connected in parallel with first timer switch contact, to insure that electrical line 105 remains energized and consequently first control relay winding 1CR remains energized. When an out-of-range condition exists, indicated by light 124, the calibrate switches 128 and 137 should be manually thrown energizing second timer relay 2TR and second control relay 2CR, and first control relay 1CR, respectively, thereby rearranging the motor circuit of FIG. 4 to actuate repositioning of the fine zero adjustment tap 54 and associated positioning means, to be explained more fully hereinafter.

FIG. 4 is representative of the motor circuit of a stepping motor which is a two-phase, permanent magnet, multiple pole synchronous motor actuated by means of switches. As can be seen, an alternating current supply voltage is fed to the primary winding 140 of transformer 142 having a center tapped secondary winding 144. Diodes 146 and 148 are connected between the respective ends of the secondary winding 144 and common terminal 151 in supply lines 147 and 149, respectively. The diodes are opposed in direction to produce full wave rectification of the supply current provided between terminal 151 and the center tap of the transformer secondary.

There is connected between the center tap of secondary winding 144 and terminal 151 a combination of circuit components comprising a switching circuit 150, a lag winding 152 for the stepping motor, a lead winding 154 for the motor, a first control relay-operated normally-closed switch 1CR1, a capacitor 158, and a current-limiting resistor 160. Connected from between the lag winding 152 and lead winding 154 to supply line 149, which is connected to one end of secondary winding 144 is a first control relay-operated normally-open switch 1CR2. In parallel with lead winding 154, first control relay-operated switch 1CR1 and capacitor 158, there is connected a by-pass resistor 168. Switches $S_1$ and $S_2$ are preferably silicon controlled rectifiers having their control electrode connected to voltage source 170 and their main flow paths connecting opposite ends of resistor 168 through a first timing relay normally-open switch 1TR2 to supply line 149.

Switching circuit 150 in FIG. 4 comprises an interconnected group of switches actuated by their associated relays located in the circuit of FIG. 3 and by the cam elements schematically illustrated in FIG. 5. A terminal 153 provides a junction point between switching circuit 150 and lag winding 152. More specifically, the switching circuit divides into two paths from secondary center tap terminal 180. One path includes a second control relay-operated normally-open switch 2CR2 and the other path includes a second control relay-operated normally-closed switch 2CR3. The path including switch 2CR3 again divides into two paths, one through first relay-operated normally-closed switch 1CR4 to terminal 153 of lag winding 152 and the second through first relay-operated normally-open switch 1CR3 to a terminal 194. The path including switch 2CR2 also divides into two paths, one through second timer-operated normally-open switch 2TR2 to terminal 194 and the second through second timer-operated normally-closed switch 2TR3 to a terminal 200. From terminal 200 the line again divides into two parts. One path is through a normally-open forward-direction switch 202 for having the motor operate in a forward direction when closed to terminal 153. The other path is through a normally-open reverse-direction switch 204 to a terminal 205. Terminal 205 is electrically connected to terminal 155, which is adjacent lead winding 154, through a first relay-operated normally-open switch 1CR6. Located between terminal 153 and terminal 205 is the electrical line having reverse-direction normally-open switch 208, reverse-direction normally-open switch 204, and another electrical line forward-direction normally-open switch 210 and forward-direction normally open switch 202. Between reverse-direction switch 208 and forward-direction switch 210, there is a connection for the electrical line to terminal 194. Also located between terminal 153 and terminal 205 is another electrical line having therein a capacitor 212 and a current-limiting resistor 214. Connected from between capacitor 212 and current-limiting resistor 214 and terminal 162, which is located between the lead and lag windings, is an electrical line having capacitor 216 and a first relay-operated normally-closed switch 1CR5.

The motor circuit of FIG. 4 is connected as a stepping motor when connected by switches of relays 1CR and 1TR into the motor circuit described in U.S. Patent No. 3,264,541 above cited. It will be obvious to those skilled in the art that the motor circuit of FIG. 4 produces a rotating magnet field similar to the action of a two-phase synchronous motor, over the area of one pair of poles, causing the motor to step one pair of poles each actuation. The addition of a switching circuit is for the purpose, following accumulation of zero set point error, of having the motor operate in another manner to position the fine zero adjustment tap 54 in a forward or reverse direction depending on positive or negative error stepped off by the motor in response to the output of the bridge circuit fed through an analog to pulse frequency converter, as described in the above-cited U.S. Patent No. 3,264,541. The voltage source 170 here represents such a pulse source and during the stepping procedure actuates either switch $S_1$ or switch $S_2$ depending on the polarity of the error signal from the bridge circuit, as described in the above-cited application. The capacitor 212 in the switching circuit provides a capacitor type motor connection under certain switch arrangements so as to have a phase difference of practically 90° providing essentially a two-phase motor.

The combined operation of the circuits shown in FIGS. 3 and 4 is in the following manner. The switches 80 and 82 for connecting supply line 84 and 86 to the supply voltage are normally closed. On initiating the automatic zero adjustment means for correcting zero voltage output of the bridge circuit, the endless conveyor belt is operated for one or more complete revolutions to insure clearance of all loose material therefrom. The zero adjustment means is initiated by closing one of the automatic zero switches, either test switch 92 or remote switch 90, thereby energizing relay 1TR which begins to time for the one or more revolutions of the conveyor. Upon energizing the timer circuit, relay 1TR closes first timer-operated normally-open switch 1TR2, in FIG. 4, preparing the motor circuit for accepting the error pulses from the voltage to pulse-frequency converter 170 fed by the bridge load cell circuit. As previously stated, the motor circuit at this time operates in the same manner as the motor circuit disclosed in the previously cited U.S. Patent No. 3,264,541, stepping one pair of poles in response to each pulse from the converter 170. The stepping may be forward or backward depending on the polarity of the pulse and the switch $S_1$ or $S_2$ effected. The visual alarm light 99 is energized until the automatic zero adjustment of tap 54 is completed. The output shaft of the motor 225 (having windings 152, 154) positions a memory device comprising a set of cams 230, 232 and 234 which store the forward or reverse direction movements of the motor output responding to the error pulses received by the motor during the sampling time of the conveyor. The positioning cams may be designed generally to accumulate an error as high as 3 percent above or below the active load of the scales before the cams reach a physical limit of adjustment.

At the end of the sampling time, timer motor 1TR actuates closed normally-open timer contact switch 1TR1, thereby energizing solenoid clutch actuator 116 and first control relay winding 1CR. The energization of solenoid clutch actuator 116 causes clutch 240, which has previously been disengaged, to couple motor 225 and cams 230, 232 and 234 to the automatic zero adjustment variable tap 54. With first control relay 1CR energized, the motor circuit of FIG. 4 is rearranged as a synchronous capacitor type motor, relay 1CR actuating its associated first relay-operated switches in the motor circuit, whereby normally-open switch 1CR3 closes, normally-closed switch 1CR4 opens, normally-closed switch 1CR5 opens, normally-open switch 1CR6 closes, normally-closed switch 1CR1 opens, and normally-open switch 1CR2 closes. Either forward-direction switch 210 for energizing the motor to operate in one direction or the reverse-direction switch 208 for energizing the motor to operate in the opposite direction is selectively actuated closed by zero correction cam 232 or cam 230, respectively, depending on the positive or negative error accumulated as motor shaft position on the error memory cams which were positioned initially by the motor in response to the error signal from the bridge circuit. The closing of the forward-direction or reverse-direction switches determines the direction of motor output rotation which is of a direction to reposition the error positioning cams back to their original starting position in the course of which the fine zero adjustment variable tap 54 is driven by them along variable tap resistor 50, a distance proportional to the error stored in the cam, thereby adjusting the output of the bridge load cell circuit to a zero set point by an amount representative of the negative of the average error per revolution in the previous zero set of the conveyor so that at no load the average per revolution will be a true zero. Timer circuit 97, solenoid clutch actuator 116 and first central relay winding 1CR remains energized in the switching circuit of FIG. 3 until the mechanically ganged, cam actuated zero adjustment switches are disengaged and opened.

If the zero adjustment of the bridge circuit output is too large to be made by the positioning cams moving the fine zero adjustment variable tap 54 along variable tap resistor 50, the solenoid clutch actuator 116 of FIG. 3 will disengage, thereby uncoupling the positioning cams and the variable tap, as will be explained hereinafter. Such disengagement will occur during the sequence of movement of the positioning cams and fine zero adjustment variable tap. Also, as seen in FIG. 5 when the variable tap has reached its limit of movement, it strikes out-of-range positioning cam 234 which actuate out-of-range switch 120 closed (see FIG. 3). Light 124 will consequently be illuminated indicating that an out-of-range condition exists for the fine zero adjustment apparatus, and third control relay winding 3CR will be energized. Switch 3CR1 is actuated open by the third control relay 3CR deenergizing solenoid clutch actuator 116, thereby uncoupling the fine positioning drive means from the fine zero adjustment tap.

Correction of the out-of-range condition indicated by light 124 is made by having an operator manually close the mechanically ganged calibrate switches 128 and 137, which keep electrical lines 105 and 130 energized during the out-of-range correction. With the circuit through electrical line 130 energized, second timer relay 2TR and second control relay winding 2CR are energized, and light 134 is illuminated indicating that the out-of-range correction has been initiated. Second timer relay 2TR actuates its associated switches in the circuit of FIG. 4 to have the timer-operated normally-open switch 2TR2 close and switch 2TR3 open, at the same time second control relay 2CR actuates its associated switches in the circuit of FIG. 4. Second timer relay 2TR operates for a predetermined period of time before actuating open the second timer-operated normally-closed switch 2TR1 in electrical line 105.

With the connections described through the out-of-range switching apparatus, the motor circuit of FIG. 4 is connected as a synchronous capacitor type motor and the potentiometer centering cams 236 and 238 actuate closed either the forward-direction switch 204 or the reverse-direction switch 202, depending on the initial setting of travel of the fine positioning cams, thereby having the motor through the potentiometer centering cams 236 and 238 and solenoid actuated clutch return the fine zero adjustment variable tap to its center position along variable tapped resistor 50. After this occurs, the predetermined time delay for second timer relay 2TR expires and second timer-operated normally-closed switch 2TR1 opens, thereby deenergizing solenoid clutch actuator 116, disconnecting the zero positioning cams 230 and 232 from the fine zero adjustment tap. With clutch actuator 116 disengaged, the motor, through second timer-operated switch contacts 2TR2 and 2TR3, is rearranged to operate in response to the position of the forward direction switch 208 or the reverse direction switch 210, thereby having the motor operate exactly as first described in connection with zero correction to return the cams 230 and 232 and hence the shaft of motor 225 back to their initial position.

The operator of the conveyor can then normally make adjustment of the coarse zero adjustment variable tap 56 along variable tap resistor 52 to correct the bridge circuit output for having the fine zero adjustment apparatus in range for fine corrections. The calibrate switches 128 and 137 and the automatic zero adjustment switches 90 and 92 should be normally opened.

Further fine zero adjustment of the output of the bridge circuit can be made by reinitiating the fine zero adjustment through closing one of the zero adjustment switches 90 or 92.

From the above description, it will be seen that by the present invention it is possible to automatically compensate for zero shifts of the output of the bridge load cell circuit caused by changes in temperature and atmospheric pressure, material clinging to the conveyor belt and other causes inherent with conveyor scales. The zero adjustment means of the present invention provides adjustment for error signals of either polarity from the bridge circuit. It will also be appreciated that the present invention assures accurate adjustment of the bridge circuit output with an automatic and systematic procedure through timer and switching circuits operating in a sequency of planned steps.

While the invention has been described with particular reference to a specific embodiment thereof, it will be understood that it may be embodied in a large variety of forms different from the ones specifically shown and described without departing from the scope and spirit of the invention as defined by the appended claims.

I claim:

1. A weight indicator zero-adjustment apparatus for a belt conveyor comprising:
    an electrical device having an adjustable average zero set point for measuring the weight of sequential sections of the conveyor and producing an electrical output representative of the weight of sequential sections of the conveyor and its load measured by the electrical device relative to said average zero set point;
    a zero adjustment means associated with the electrical device to adjust the average zero set point of the electrical device;
    motor and memory means to respond to the electrical device to additively accumulate instantaneous deviation from in the zero set point and to readjust the zero adjustment means to correct error detected in the average zero set point and
    coupling means to couple selectively the electrical device to the motor and memory means for a predetermined number of full revolutions of the conveyor in order to position the memory means to represent the average error per revolution in the zero set and to couple subsequently the drive means to a power source and the drive means to the zero adjustment means for adjusting the zero adjustment means by an amount representative of the negative of the average error per revolution.

2. The weight indicator of claim 1, in which the electrical device measuring the weight of sequential sections of the conveyor includes an electrical load cell.

3. The weight indicator of claim 2, in which the load cell includes a bridge circuit having a pair of input terminals across which a voltage source is connected and a pair of output terminals.

4. The weight indicator of claim 3, in which the zero adjustment means is applied across at least one of the input terminals and one of the output terminals.

5. The weight indicator of claim 4, in which the zero adjustment means includes electrical resistance means including at least one variable element between each of the input terminals and a selected one of the output terminals.

6. The weight indicator of claim 5, in which the zero adjustment means is a variable resistor connected between the input terminals and the variable tap is connected to an output terminal.

7. The weight indicator of claim 1, in which said memory means accumulates incremental deviations from the set zero and averages them over an integral number of complete revolutions; said coupling means comprises a plurality of circuits selectively connectable to a source of electrical power including a first circuit having time means for timing one or more complete revolutions of said conveyor and having a timer switch means associated with said timer means limiting accumulations of error in the zero set point to a predetermined integral number of revolutions of the belt conveyor; and said coupling means includes a second circuit having a switch responsive to said timer means connected therein for energizing said circuit, said second circuit including an electrical clutch actuator means for moving a clutch into engagement, said clutch coupling the motor and memory means to said zero adjustment means whereby said zero adjustment means is positioned to a new zero set position correcting the average zero error using the average error accumulated in said memory means.

8. The apparatus of claim 7 in which said motor and memory means comprises a reversible motor having a shaft coupled to the memory means and responsive when coupled by the coupling means to the electrical device to respond said shaft to zero set error signals, moving stepwise to accumulate in terms of shaft position the average error per revolution and in which circuit by which said motor is coupled to the electrical device alternatively connects switch means responsive to the memory means to determine the direction of rotation of the motor, said motor circuit being rearranged following the preselected time to cause the motor to drive in a direction and for a distance determined by the coalition of the memory means and the switch means.

9. The apparatus of claim 6 in which the motor means is a reversible motor having a shaft responsive to the signal from the electrical device for operating said motor to produce a shaft and memory means position indicative of accumulataed outputs of the electrical device; the movable tap of said variable resistance being selectively coupled to the motor means for being repositioned in accordance with memory means position, in which the coupling means includes timer means to operate for a predetermined time defining an integral number of complete revolutions of said conveyor; means to connect the motor shaft to said movable tap when said timer means has operated for said predetermined time, and means for energizing said motor to return said motor shaft, coupled to said movable tap, to the original position of the motor shaft after said timer means has operated for said predetermined time, thereby repositioning said variable tap to correct the electrical device and establish a new zero set point which corrects the average error in the previous zero set.

References Cited
UNITED STATES PATENTS 3,081,830  3/1963  Spademan _____ 177—211
3,209,846  10/1965  Karlen _____ 177—211

RICHARD B. WILKINSON, *Primary Examiner.*

ROBERT S. WARD, Jr., *Assistant Examiner.*